United States Patent
German et al.

(10) Patent No.: US 8,739,834 B2
(45) Date of Patent: Jun. 3, 2014

(54) RESILIENT PLUG APPARATUS AND METHOD OF USE

(75) Inventors: Mikhail German, Johnston, RI (US); Leo Fleury, North Smithfield, RI (US)

(73) Assignee: Mueller International, LLC, Atlanta, GA (US)

( * ) Notice: Subject to any disclaimer, the term of this patent is extended or adjusted under 35 U.S.C. 154(b) by 229 days.

(21) Appl. No.: 13/341,516

(22) Filed: Dec. 30, 2011

(65) Prior Publication Data

US 2012/0097283 A1  Apr. 26, 2012

Related U.S. Application Data

(63) Continuation of application No. 12/792,566, filed on Jun. 2, 2010, now Pat. No. 8,104,517.

(60) Provisional application No. 60/183,711, filed on Jun. 3, 2009.

(51) Int. Cl.
*F16L 55/128* (2006.01)
*F16K 43/00* (2006.01)

(52) U.S. Cl.
USPC .................. 138/89; 138/93; 138/97; 138/94; 137/15.15; 137/318

(58) Field of Classification Search
USPC .................. 138/89, 90, 93, 94; 137/317, 318, 137/15.08, 15.15
See application file for complete search history.

(56) References Cited

U.S. PATENT DOCUMENTS

| | | | |
|---|---|---|---|
| 2,482,687 A | 9/1949 | Mueller et al. | |
| 3,032,069 A | 5/1962 | Ficklin | |
| 3,674,055 A | 7/1972 | Ray | |
| 4,040,450 A | 8/1977 | Boundy | |
| 4,064,912 A | 12/1977 | Petrone | |
| 4,155,373 A | 5/1979 | DiGiovanni | |
| 4,202,377 A | 5/1980 | Harrison | |
| 4,205,697 A | 6/1980 | Gebelius | |
| 4,310,029 A | 1/1982 | Dudek | |
| 4,369,813 A | 1/1983 | Thomas | |
| 4,552,170 A | 11/1985 | Margrave | |
| 5,082,026 A | 1/1992 | Smith | |
| 5,152,310 A | 10/1992 | O'Bryon | |
| 5,224,516 A * | 7/1993 | McGovern et al. | 138/97 |
| 5,297,581 A | 3/1994 | Godfrey | |
| 5,316,037 A * | 5/1994 | Martin | 137/318 |
| 5,483,990 A | 1/1996 | Martin | |

(Continued)

FOREIGN PATENT DOCUMENTS

CA  2706096  9/2012
GB  1311017  3/1973

OTHER PUBLICATIONS

German; U.S. Patent Application entitled: Resilient Plug Apparatus and Method of Use assigned U.S. Appl. No. 12/792,566, filed Jun. 2, 2010, 25 pages.

(Continued)

*Primary Examiner* — Patrick F Brinson
(74) *Attorney, Agent, or Firm* — Taylor English Duma LLP

(57) ABSTRACT

Systems, apparatuses, and methods of use of a plug assembly are disclosed herein. The plug assembly includes an expandable plug for use with a pipe having an annular wall defining an outer wall surface and an inner wall surface.

36 Claims, 8 Drawing Sheets

(56) References Cited

U.S. PATENT DOCUMENTS

| | | | |
|---|---|---|---|
| 5,524,661 A | | 6/1996 | Tigerholm |
| 5,531,250 A | | 7/1996 | Freeman et al. |
| 5,620,020 A | * | 4/1997 | Collins .................. 137/318 |
| 5,676,171 A | | 10/1997 | Heed |
| 6,035,898 A | | 3/2000 | Dominguez |
| 6,446,662 B1 | | 9/2002 | Wagner |
| 6,588,455 B1 | | 7/2003 | Welfare |
| 6,659,133 B2 | | 12/2003 | Russell |
| 6,892,752 B2 | | 5/2005 | Burlock et al. |
| 8,104,517 B2 | | 1/2012 | German |
| 2010/0307604 A1 | | 12/2010 | German |

OTHER PUBLICATIONS

German; Non-Final Rejection for U.S. Appl. No. 12/792,566, filed Jun. 2, 2010, mailed Aug. 5, 2011, 7 pages.

German; Notice of Allowance and Fees Due for U.S. Appl. No. 12/792,566, filed Jun. 2, 2010, mailed Sep. 30, 2011.

German; Examiner Initiated Interview Summary for U.S. Appl. No. 12/792,566, filed Jun. 2, 2010, mailed Sep. 30, 2011.

German; U.S. Patent Application entitled: Resilient Plug Apparatus and Method of Use assigned U.S. Appl. No. 61/183,711, filed Jun. 3, 2009, 25 pages.

German; U.S. Patent Application entitled: Resilient Plug Apparatus and Method of Use assigned U.S. Appl. No. 61/183,346, filed Jun. 2, 2009, 25 pages.

German; Canadian Patent Application entitled: Resilient Plug Apparatus and Method of Use assigned serial No. 2,706,096, filed Jun. 3, 2010, 25 pages.

Canadian Office Action for serial No. 2,783,410, filed Jun. 3, 2009, mailed Oct. 10, 2012, 2 pgs.

German, Mikhail; Canadian Office Action for serial No. 2,783,410, filed Jun. 3, 2010, mailed Oct. 10, 2013, 2 pgs.

* cited by examiner

RESILIENT PLUG APPARATUS AND METHOD OF USE

CROSS-REFERENCE TO RELATED APPLICATIONS

This application is a continuation of U.S. application Ser. No. 12/792,566, filed Jun. 2, 2010, which claims the benefit of U.S. Provisional Patent Application No. 60/183,711, filed Jun. 3, 2009, both of which are hereby specifically incorporated by reference herein in their entireties.

BACKGROUND

1. Field of the Invention

The present invention relates to systems and methods for blocking media flow through a pipe and a system for utilizing the method. Particularly, but not exclusively, embodiments of the invention provide methods and systems for temporarily blocking the bore of a pipe such as, for instance, a gas or water main pipe.

2. Description of the Related Art

Pipelines are used for a variety of purposes, such as, transmitting gas or fluid. In certain instances, it is desirable to interrupt the flow of a gas or fluid, through a given pipeline without shutting down an entire pipeline system; this is commonly referred to as line stopping. For example, it may be desirable to make repairs on a section of the pipeline or replace equipment associated with the pipeline. In these instances, line stopping may be necessary.

A variety of different methods and devices are known for temporarily stopping flow through a pipeline to enable maintenance to be carried out on a particular section of pipe without removing the whole pipe from service. Most of these devices are designed to be inserted through one or more holes drilled in the pipe wall using well known drilling apparatuses designed for operations under pressure. For instance, within the gas industry inflatable stopping bags are widely used. Such bags are designed to be inserted, while in a deflated state, through a hole drilled in the pipe wall and then subsequently inflated to form a sealed blockage in the pipe.

While simple stopping bag devices may be suitable for use in relatively low pressure applications, such as in low pressure gas pipelines, they are less suitable for higher pressure situations. Under these conditions, the bag may tend to be pushed along the length of pipe by the high pressure gas or fluid or to burst. One known technique for addressing this problem is to provide additional mechanical supports for the bag. However, these additional supports require further holes to be drilled into the pipe wall, which can impact the integrity of the pipeline.

Another known technique for stopping the flow of media within a pipeline is by inserting a cylindrical deformable plug through an access hole drilled in the wall of a pipe. After the plug is inserted, it is deformed to prohibit flow of media within the pipe. In these plug designs, the deformable plug includes a mechanical component that engages the opposing pipe wall to compress and deform the plug to seal the pipe. Because the force required to deform the plug can be significant, there is a potential of deforming or cracking the pipe, especially if the pipeline is plastic. In some cases, a separate physical stop is attached to the pipe for the mechanical component to engage instead of the pipe wall. In these cases, however, the physical stop is rigidly attached to the pipe and the engagement of the plug mechanical component can still cause damage to the pipe or separation of this physical stop from the pipe. Yet another method involves the use of a resilient cup-shaped plug with a diameter slightly larger than the inside diameter of the pipe. This plug is delivered inside the pipe and positioned in such a way that its axis coincides with the pipe axis. A problem encountered with these devices is that with increasing pressure within the pipeline, the plug can be difficult to remove from the pipe. Therefore there is a need in the industry for improved line stopping devices and methods.

SUMMARY OF THE INVENTION

Various embodiments of the present invention provide improved line stopping devices and methods. In one aspect of the invention, a method of blocking media flow through a pipe is provided. The pipe has a longitudinal axis and an annular wall defining an outer wall surface and an inner wall surface, where the inner wall surface defines an inner pipe diameter. The method includes the steps of attaching a fitting to the outer wall surface of the pipe, wherein the fitting includes a channel providing access to a portion of the outer surface of the pipe; forming two substantially aligned apertures in the wall of the pipe and two scalloped sections substantially aligned with the apertures on the inner wall surface of the pipe using the access provided by the fitting, wherein the apertures have a diameter larger than the pipe inside diameter; inserting a plug assembly into the pipe through one of the apertures, wherein the plug assembly includes a resilient plug, the resilient plug having an outside diameter smaller than the aperture diameters and larger than the inner pipe diameter, and wherein a portion of the plug assembly extends through the other aperture; and expanding the resilient plug to engage the scalloped sections.

In another aspect, a system for blocking the flow of media through a pipe is provided. The pipe has a longitudinal axis and an annular wall defining an outer wall surface and an inner wall surface, where the inner wall surface defines an inner pipe diameter. The system includes a fitting configured to be secured to and surround a section of the pipe, wherein the fitting defines a channel that is configured to provide access to an area on the outer surface of the pipe to facilitate forming an aperture in the pipe wall and a plug assembly. The plug assembly includes an upper plate; a lower plate; a cylindrical resilient plug disposed between the upper and lower plate, the resilient plug having an outside diameter larger than the inner pipe diameter; and a shaft configured to selectively rotate causing a distance between the upper plate and the lower plate to change. The plug assembly is configured to be inserted through the channel and the aperture formed in the pipe annular wall.

In a further aspect of the invention, a plug assembly for blocking the flow of media through a pipe is provided. The pipe has a longitudinal axis and an annular wall defining an outer wall surface and an inner wall surface where the inner wall surface defines an inner pipe diameter. The plug assembly includes an upper plate; a lower plate; a cylindrical resilient plug disposed between the upper and the lower plate, the resilient plug having an outside diameter larger than the inner pipe diameter; and a shaft configured to selectively rotate causing a distance between the upper plate and the lower plate to change.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 8:
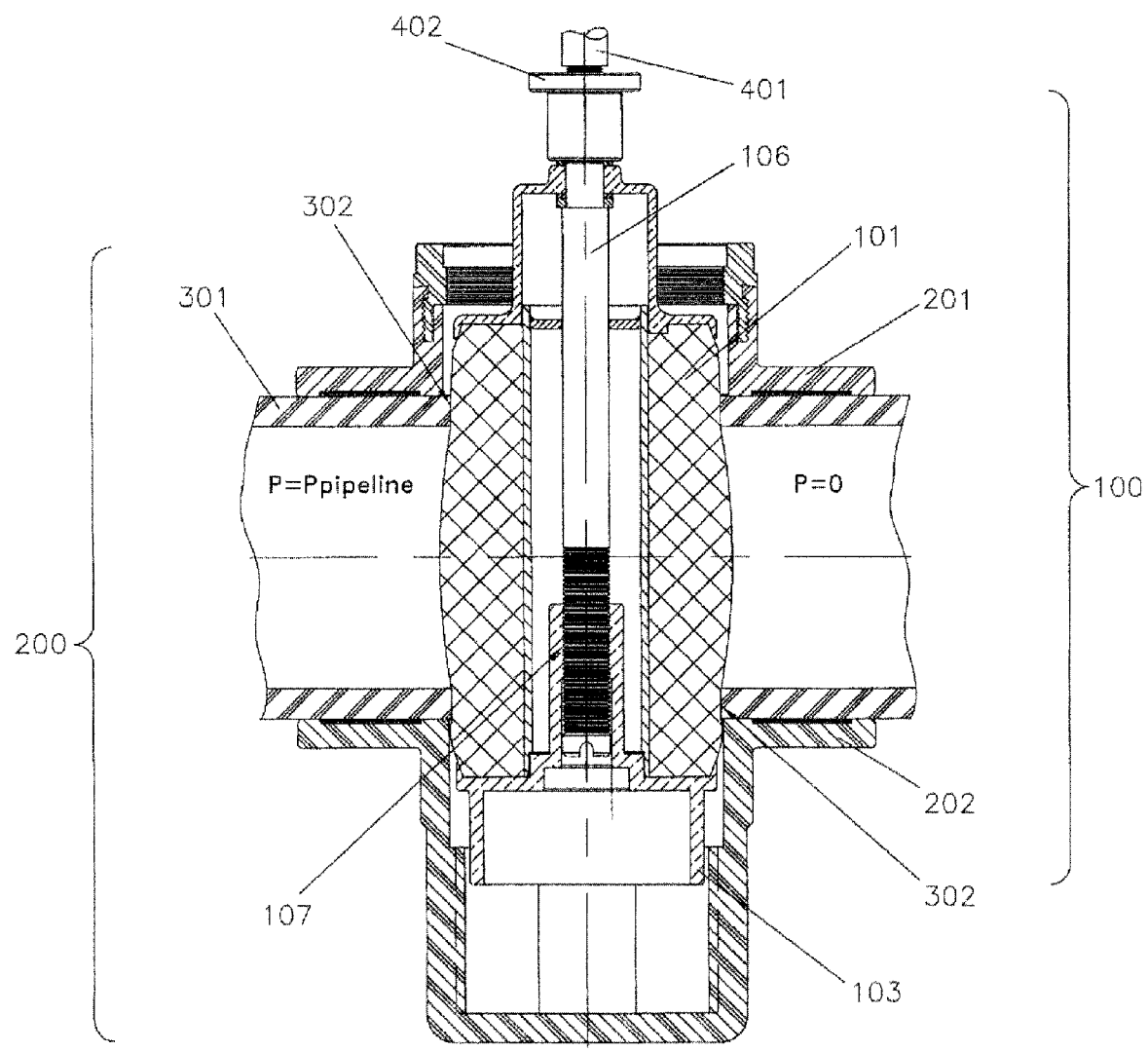
Figure 9:
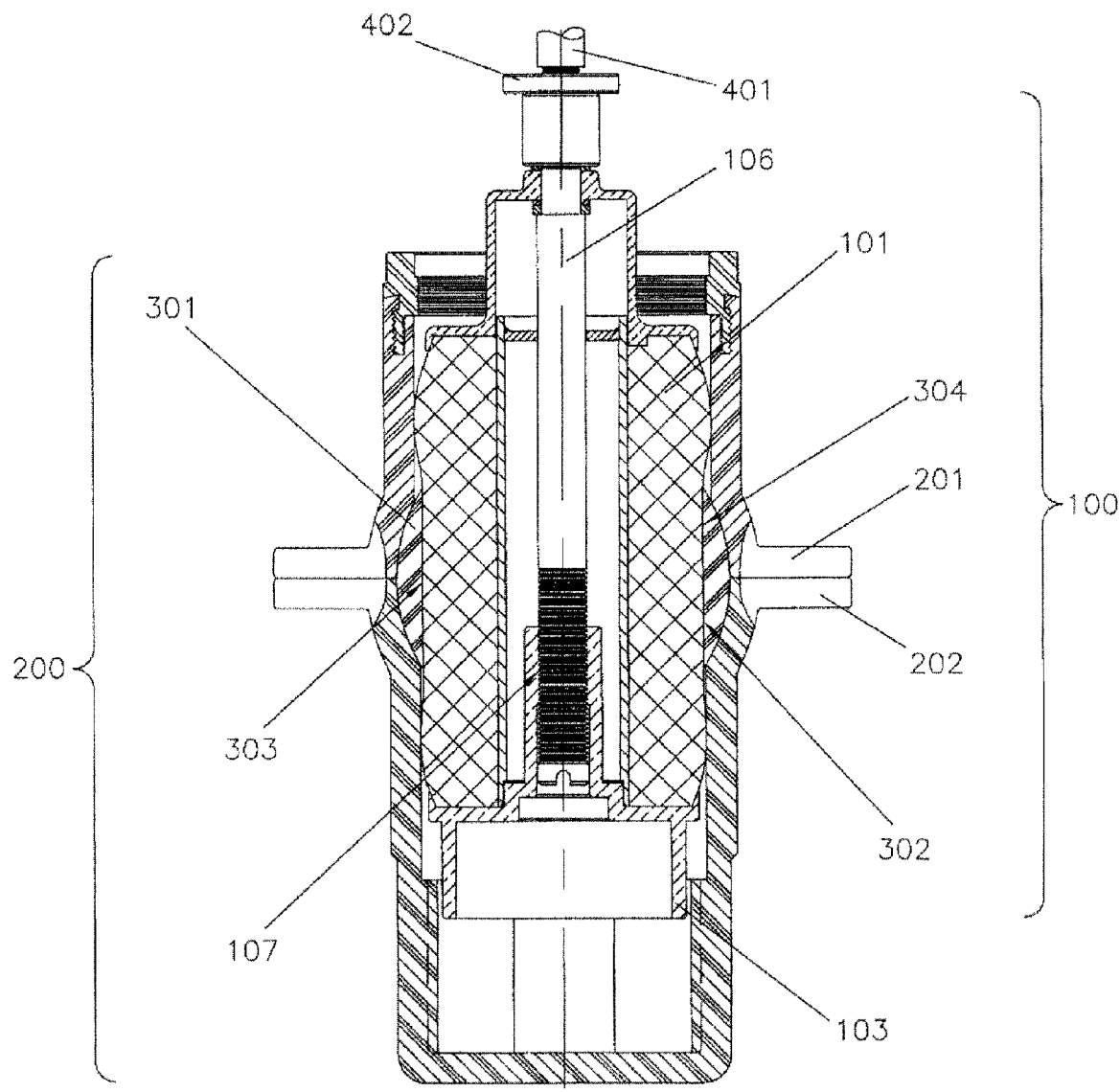

FIG. 8 is a cross-sectional view of a pipeline stopping system, in accordance with an embodiment of the present invention, taken along the pipe, wherein the plug is expanded in the pipeline and media flow through the pipe is stopped, FIG. 9 is a cross-sectional view of a pipeline stopping system, in accordance with an embodiment of the present invention, taken across the pipe, wherein the plug is expanded in the pipeline and media flow through the pipe is stopped.

Figure 10:
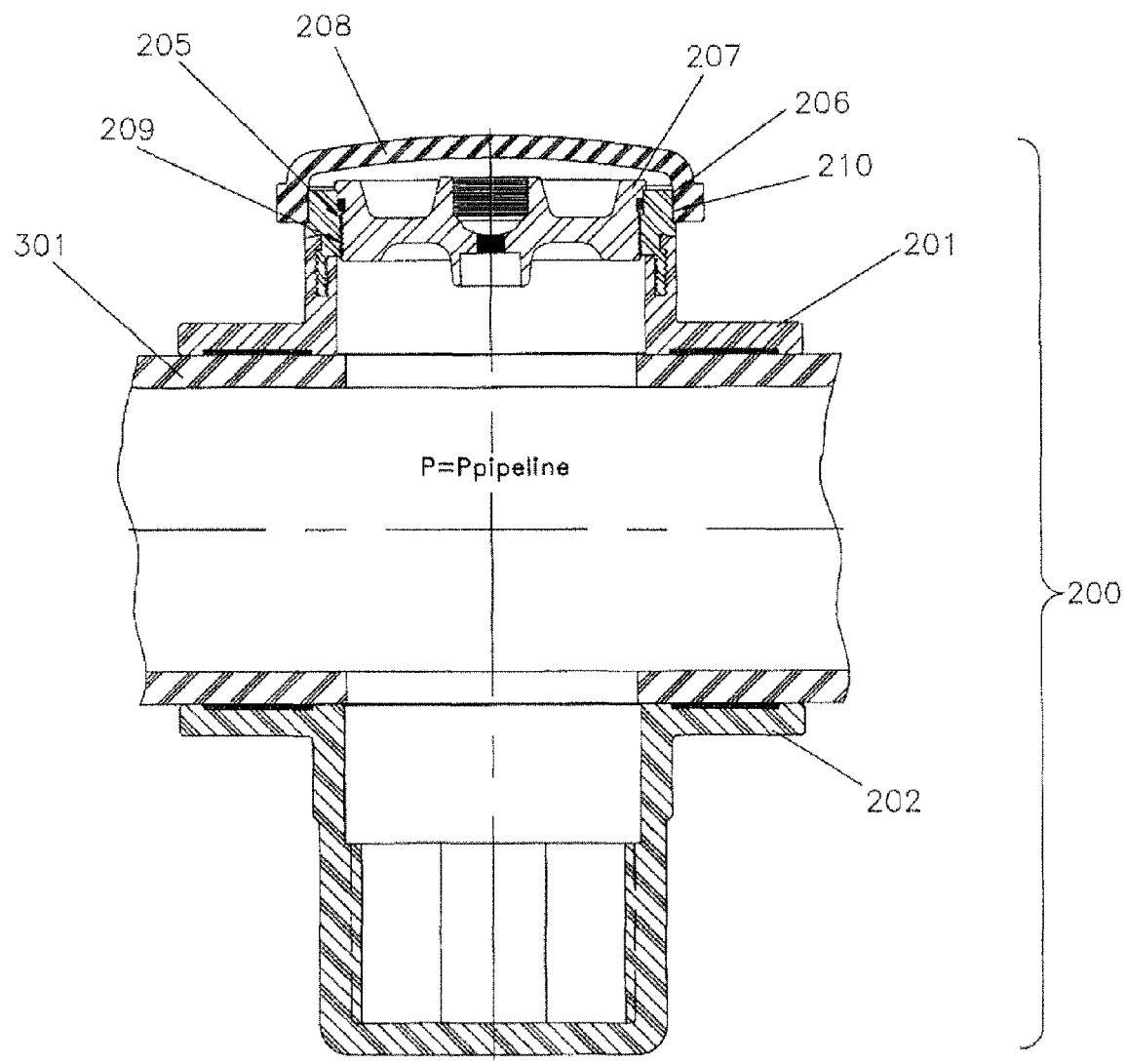

FIG. 10 is a cross-sectional view of a fitting of a pipeline stopping system, in accordance with an embodiment of the present invention, installed onto a pipe and assembled with a completion plug and cap.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Various embodiments of the present invention provide apparatuses and methods for stopping the flow of media within a pipeline. The pipeline generally includes one or more pipes connected end-to-end, where each of the pipes has a longitudinal axis with an annular wall. The annular wall has an outer wall surface and an inner wall surface, where the inner wall surface defines an inner pipe diameter. In various embodiments, a hole is formed in the pipeline substantially perpendicular to the longitudinal axis of the annular wall and extending through the opposing pipe wall. A resilient plug is positioned within the pipeline such that it extends between the holes and is selectively expanded in a radial direction to create a seal with the inner surface of the pipe and holes to prevent flow of the media within the pipe. Embodiments of the present invention may be used in connection with any type of pipe including plastic (e.g., polyethylene, polypropylene, PVC, etc.) and metal pipes.

Figure 1:
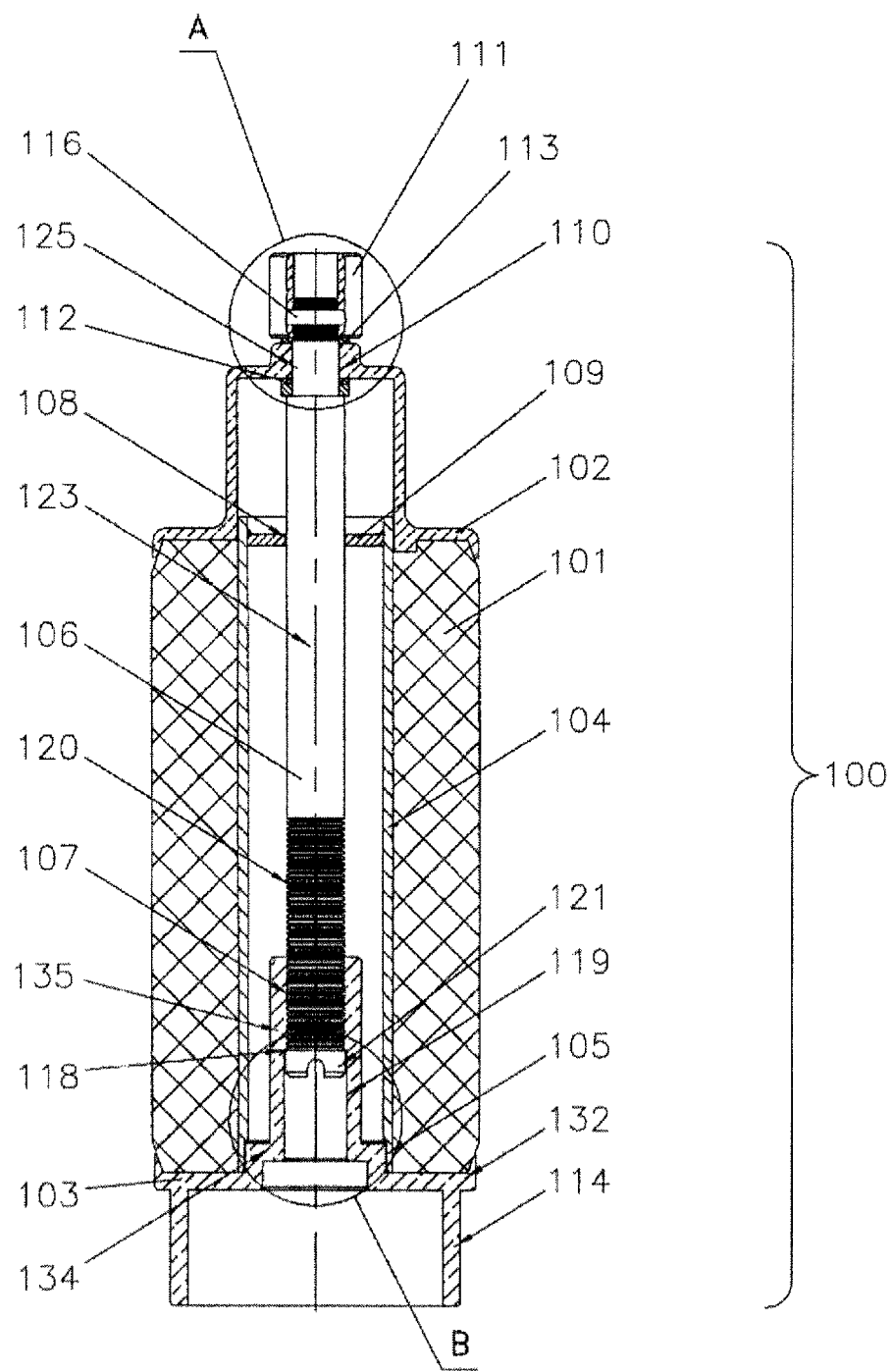
FIG. 1 is a side, cross-sectional view of a plug assembly, in accordance with an embodiment of the present invention.
Figure 2:
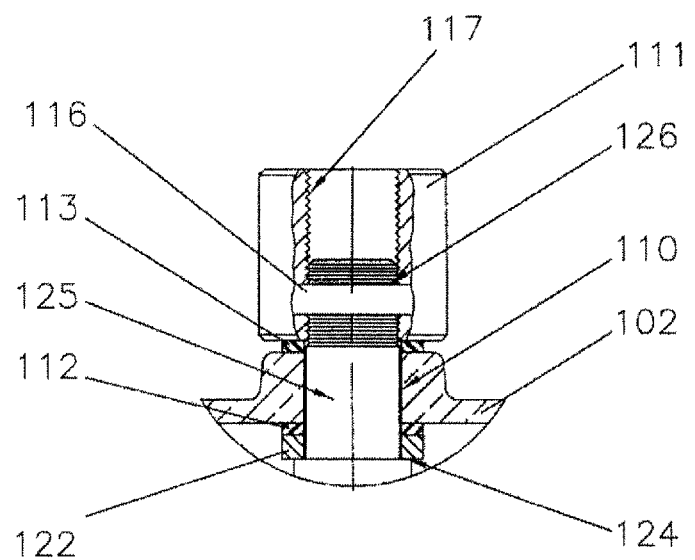
FIG. 2 is a close-up view of detail "A" of the plug assembly, in accordance with the embodiment of the present invention shown in FIG. 1.
Figure 3:
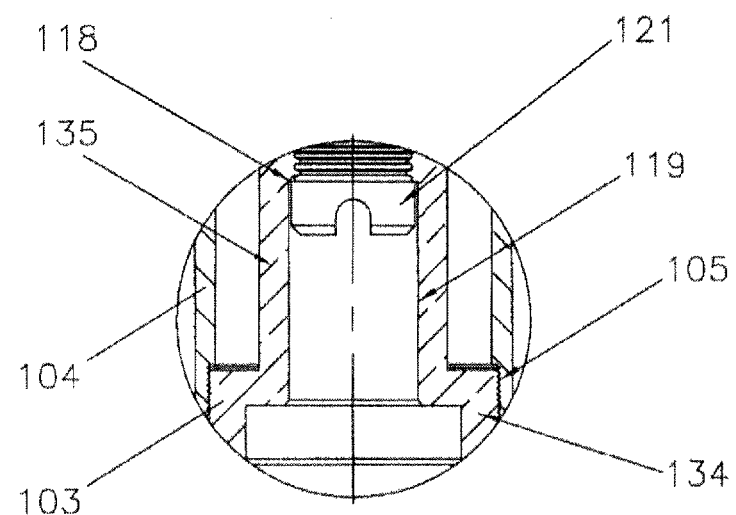
FIG. 3 is a close-up view of a detail "B" of the plug assembly, in accordance with the embodiment of the present invention shown in FIG. 1.

FIGS. 1, 2, and 3 illustrate an embodiment of a plug assembly 100 in accordance with an embodiment of the present invention. The plug assembly 100 includes a cylindrical resilient plug 101, an upper plate 102, a lower plate 103, a mandrel 104 and a shaft 106. The resilient plug 101 is positioned between upper plate 102 and lower plate 103. The mandrel 104 is positioned inside the resilient plug 101 and extends between the upper plate 102 and the lower plate 103. The shaft 106 is positioned within the mandrel 104 and is configured to rotate. Through engagement with the upper plate 102 and lower plate 103, the rotation of the shaft 106, depending on its direction, causes the lower plate 103 to move towards or away from the upper plate 102 thereby deforming or relaxing the resilient plug 101, respectively. As the resilient plug 101 is deformed, it also conforms to the interior surface of the pipe thereby providing a seal that blocks media from flowing within the pipe.

The upper plate 102 defines a substantially cylindrical cavity with an annular flange extending outwardly proximate the rim of the cavity. The upper plate 102 also defines an alignment hole 110 proximate the center of the cylindrical cavity. In the plug assembly 100, the cavity opens towards the resilient plug 101, and the flange engages one end of the resilient plug 101.

In various embodiments, the resilient plug 101 is formed of rubber or other deformable material and has a generally cylindrical shape. The resilient plug 101 has an outer diameter and an inner bore diameter. As will be described in greater detail below, the outer diameter of the resilient plug 101 is sized to be larger than the inner diameter of the pipe to be stopped but smaller than the diameter of the apertures formed in the side walls of the pipe. In the illustrated embodiment, the inner bore cross-section is substantially circular; however, other embodiments may have different shaped inner bore cross-sections.

In the illustrated embodiment, the mandrel 104 has a cylindrical structure that may be connected to the lower plate 103 through engagement of threads 105 on the mandrel 104 and complementary threads on the lower plate 103. In other embodiments, the mandrel 104 may be connected to the lower plate 103 via other means such as welding or other known techniques for attachment. In the plug assembly 100, the mandrel 104 is positioned within the cylindrical bore of the resilient plug 101 and slideably engages the cylindrical cavity defined by the upper plate 102. As will be understood by those of skill in the art, the mandrel 104 and the cavity defined by the upper plate 102 may be of any complementary shape.

A positioning plate 109 may be located within the mandrel 104 proximate the end of the mandrel 104 opposite the threaded end of the mandrel 104. In various embodiments the positioning plate 109 may be welded inside the mandrel 104. It should be understood, however, that the positioning plate 109 can be connected to the mandrel 104 by any known methods and/or at different locations within the mandrel 104. The positioning plate 109 defines a hole 108 sized to receive the plug shaft 106. Some embodiments may not include a position plate.

In the illustrated embodiment, the plug shaft 106 is positioned within the mandrel 104. The plug shaft 106 includes a head portion 121, a threaded portion 120, a first diameter shaft portion 123 and a second diameter shaft portion 125. The plug shaft 106 is positioned in the plug assembly 100 such that the threaded portion 120 engages the lower plate 103 and the shaft portion 123 passes through the hole 108 defined by the positioning plate 109. The first shaft portion 123 extends from the threaded portion 120 to the second shaft portion 125, which is proximate the end of the shaft opposite the head portion 121. In the illustrated embodiment, the first shaft portion 123 has a diameter greater than the diameter of the second shaft portion 125. The diameter of the second shaft portion is sized to engage a hole 110 defined in the upper plate 102 such that rotation of the shaft is permitted. At the transition between the first shaft portion 123 and second shaft portion 125, a shoulder 124 may be formed. In various embodiments, a plastic bearing washer 112 may be positioned between the shoulder 124 and the upper plate 102 in the plug assembly 100. In various embodiments, a metal washer 122 may be positioned between the shaft shoulder and the plastic bearing washer 112 to reduce wear of the plastic bearing washer 112.

The second shaft portion 125 of the plug shaft 106 may define a cross hole 126 proximate the associated end of the plug shaft 106 as illustrated in FIG. 2. During assembly of the plug assembly 100, a pin 116 may be positioned in the cross hole 126. The combination of the shoulder 124 positioned on one side of the upper plate 102 and the pin 116 located on the opposite side of the upper plate 102 restricts movement of the plug shaft 106 relative to the upper plate 102 in an axial direction. The pin 116 may also connect an adapter 111 to the plug assembly shaft 106. The adapter 111 may include a feature for attaching the plug assembly 100 to a stopping machine (not shown), In the illustrated embodiment, the adapter 111 includes female threads 117 to facilitate connection with the stopping machine. A plastic bearing washer 113 may be positioned between the adapter 111 and the upper plate 102 to reduce friction between the adapter 111 and the upper plate 102 as the shaft 106 and adapter 111 rotate to deform the resilient plug 101.

Referring to FIGS. 1 and 3, the lower plate 103 includes a plate portion 132, an attachment boss 134, a tube portion 135 and an engagement portion 114. The plate portion 132 is substantially planar and is configured to engage one end of the resilient plug 101. Formed proximate the center of the plate portion 132 is an attachment boss 134. The boss 134 is configured to facilitate attachment of the mandrel 104 to the lower plate 103. In the illustrated embodiment, the boss 134 includes external threads that are engaged by complementary threads on the mandrel 104.

The tube portion 135 of the lower plate 103 extends from the boss portion 134. The tube portion 135 includes a counterbore 119 that forms an annular ledge 118 within the tube portion 135. In the plug assembly 100, the annular ledge 118 interacts with the head 121 of the shaft 106. This interaction provides a stop, which discourages movement of the lower plate 103 in the direction away from the upper plate 102 beyond a predetermined distance. In other embodiments, the lower plate 103 may not include a counterbore and associated annular ledge 118.

Figure 4:
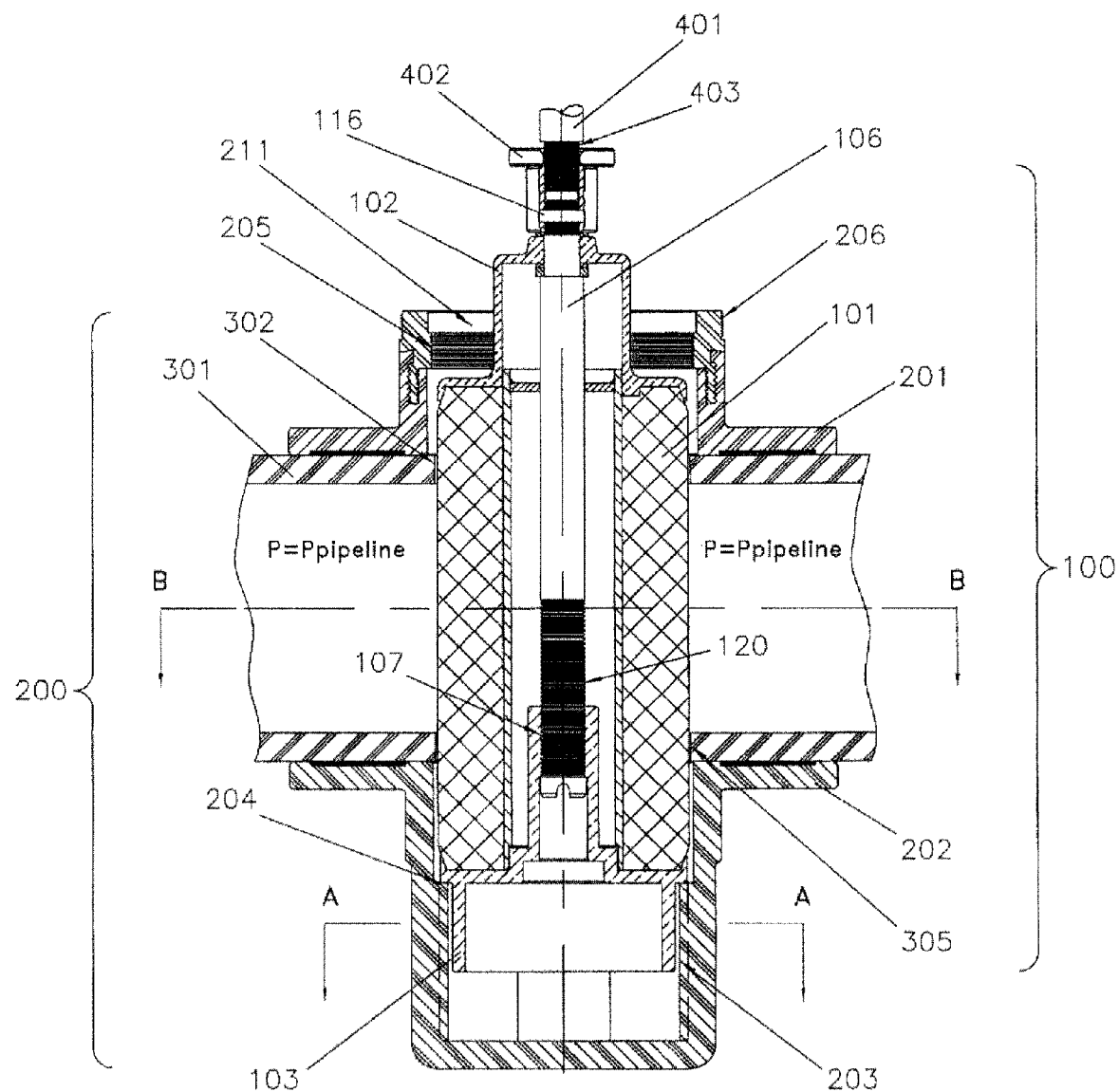
FIG. 4 is a side cross-sectional view of a pipeline stopping system in accordance with an embodiment of the present invention, wherein the plug is inserted in the pipeline.

The engagement portion 114 of the lower plate 103 extends from lower plate 103 in a direction opposite the boss 134 and tube portion 135. The engagement portion 114 defines an outer profile that is configured to engage a complementary surface on a fitting assembly as will be discussed in greater detail below. This engagement discourages relative rotational movement between the lower plate 103 and the fitting. In various embodiments, the engagement portion 114 of the lower plate 103 defines a profile that includes at least one flat surface. In the embodiment illustrated in FIG. 7, the engagement portion 114 includes four flat surfaces 115, FIG. 4 illustrates a fitting 200 attached to a portion of a conventional pipe 301 with a plug assembly 100 inserted within the fitting 200 and the pipe 301. The pipe 301 has a longitudinal axis and a circular cross-section. Apertures 302 and 305 are formed in the pipe along an axis substantially perpendicular to the longitudinal axis of the pipe 301. Typically, the pipe 301 will contain a gas or fluid, such as natural gas, water, oil, or the like.

The fitting 200 may be installed onto the pipe 301 to seal areas around the apertures 302 and 305. The fitting 200 includes an upper portion 201 and a lower portion 202. The upper portion 201 and a lower portion 202 can be secured to the pipe 301 and/or to each other by any known method of securing fittings to pipes such as, for example, welding, mechanical connection, electro-fusing or butt-fusing, and the like. In use, the fitting 200 is connected to the outer surface of the pipe 301 in such a way as to discourage leakage of the gas or fluid between the fitting 200 and the outer surface of the pipe 301. In the illustrated embodiment, the upper and lower portions 201, 202 of the fitting 200 are secured to the pipe 301 by electro-fusing. When installed, the fitting 200 in various embodiments can provide a 360° support for an outer surface of the pipe 301. The fitting 200 is typically installed before the creation of the apertures 302 and 305.

Figure 7:
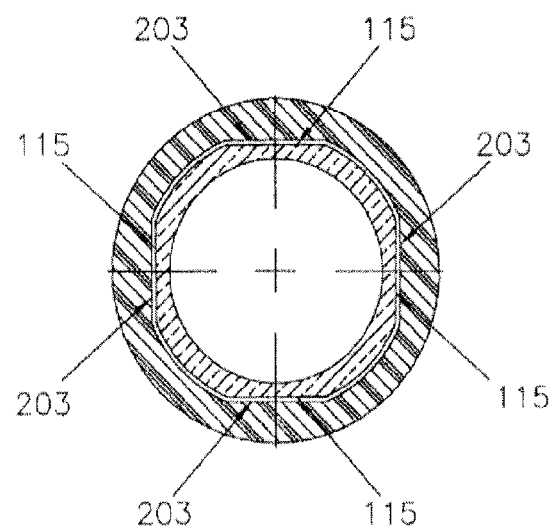
FIG. 7 is a cross-sectional view of a pipeline stopping system shown in FIG. 4, taken from the line A-A in FIG. 4.

As illustrated in FIG. 7, the lower portion 202 of the fitting 200 defines a cavity that includes one or more inner flats 203. These inner flat(s) 203, interact with the outer flat(s) 115 of the lower plate 103 of the plug assembly 100. This interaction discourages the lower plate 103 from rotating during deformation of the resilient plug 101 as discussed in greater detail below.

Referring to FIG. 4, the upper portion 201 includes a channel 211 that provides access to the pipe wall such that the apertures 302 and 305 may be drilled or otherwise created in the pipe wall. The upper portion 201 may include a threaded section 206 to facilitate attachment of a gate valve (not shown) to the fitting 200. Gate valves are well known in the piping industry. The gate valve enables access into the fitting 200, while not permitting fluid to leak out of the pipeline 301 through the fitting 200 after apertures 302 and 305 are created. In use, the fitting 200 may be attached to the pipe 301 and the gate valve (not shown) may then be connected to the fitting 200.

The apertures 302 and 305 can be formed by any known methods of creating holes in the walls of pipes. For instance, a circular cutter can remove coupons of the pipe 301 thereby forming the apertures 302 and 305 in the walls of the pipe 301.

In various embodiments, a drilling machine having a gate valve may be used to create the apertures in the pipe. The gate valve may be opened and the pipe 301 drilled to create the apertures 302 and 305 using a drilling machine (not shown). Drilling machines are well known in the piping industry and examples of drilling machine marketed by the Mueller Company™ can be found on their website (i.e. www.muellercompany.com). As one of ordinary skill in the art will understand, any type of drilling machine may be used to form the apertures 302, 305.

Figure 5:
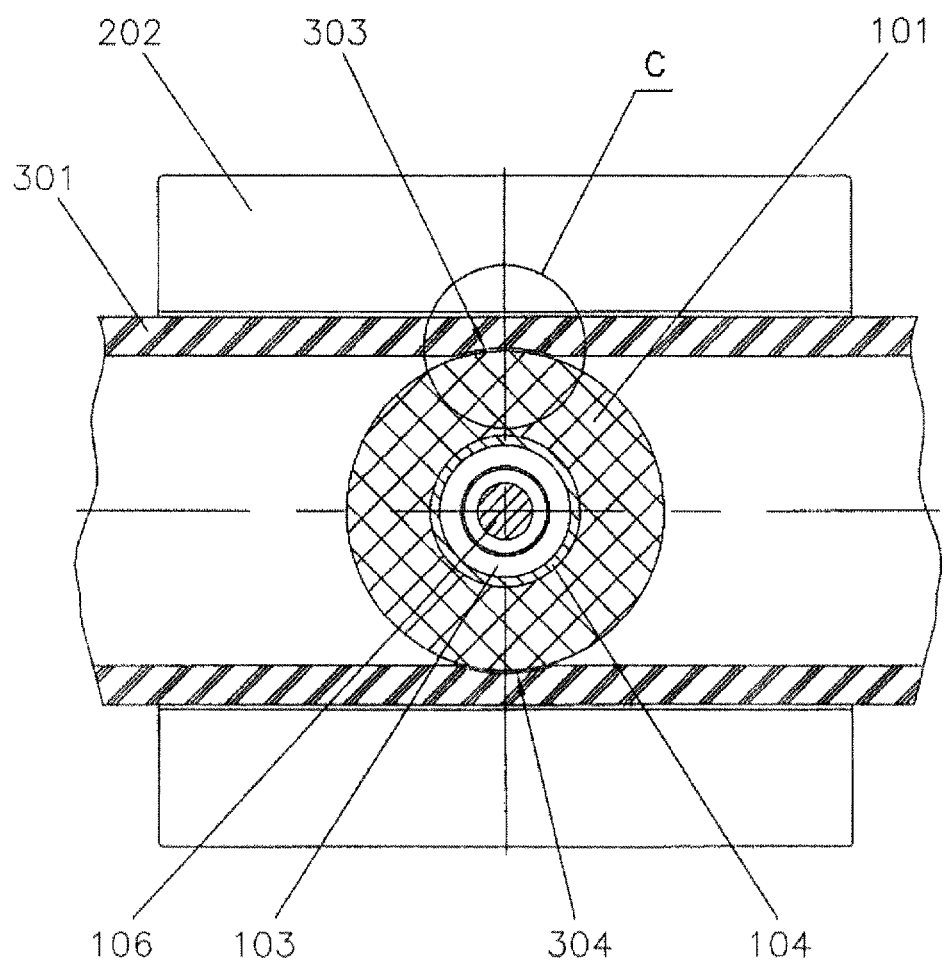
FIG. 5 is a cross-sectional view of the pipeline stopping system shown in FIG. 4, taken from the line B-B in FIG, 4.
Figure 6:
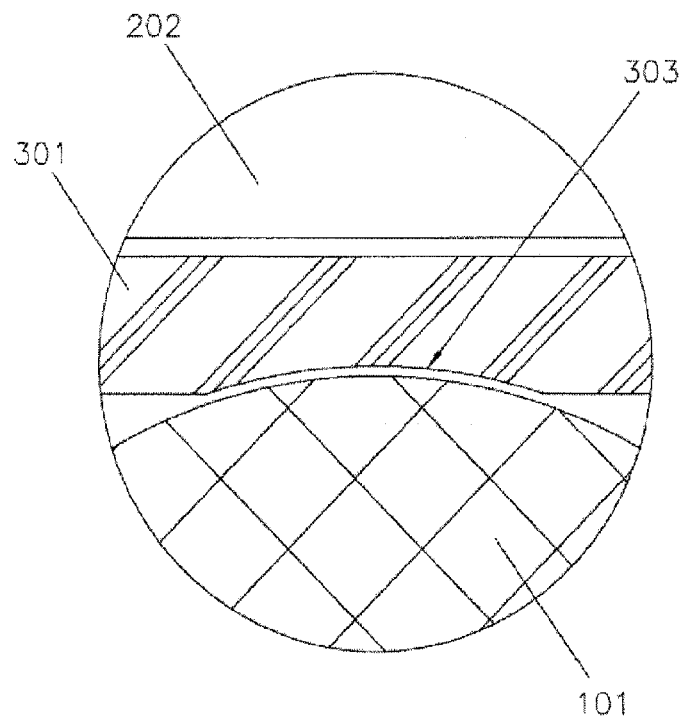
FIG. 6 is a close-up view of a detail C of the pipeline stopping system shown in FIG. 5.

In various embodiments, the diameter of the apertures 302 and 305 may be slightly larger than an inside diameter of the pipe 301, but smaller than the outer diameter of the pipe. Therefore, when drilling across the pipe 301 with a cutter, the slightly larger diameter creates two scalloped surfaces 303, 304 crossing the pipe in substantial alignment with the apertures as illustrated in FIGS. 5 and 6.

After the apertures 302, 305 are created, the gate valve (not shown) is closed, and the drilling machine (not shown) is disconnected from the fitting assembly 200. A plug assembly 100 may then be installed in the pipe through the apertures 302 and 305. In various embodiments, the plug assembly 100 may be connected to a stopping machine (not shown) before insertion of the plug assembly into the pipeline.

Stopping machines are well known in the industry. Generally, a stopping machine includes a housing and a shaft positioned within the housing. The shaft can rotate relative to the housing and selectively move in a direction substantially parallel to the shaft's longitudinal axis. Examples of stopping machines marketed by the Mueller Company™ are described at their website (i.e. www.muellercompany.com). As one of ordinary skill in the art will understand, any type of stopping machine could be used on conjunction with the present invention.

In various embodiments, the plug shaft 106 is secured to the shaft 401 of the stopping machine prior to insertion into the pipeline. Through this attachment, the stopping machine can apply a torque to the plug shaft 106 (see FIGS. 4, 8, and 9). The plug assembly 100 may be connected to the stopping machine shaft 401 by any known methods. In various embodiments, the plug assembly 100 is connected to the stopping machine shaft by engagement between the female threads 117 of the adapter 111 and male threads 403 of the stopping machine shaft 401 as illustrated in FIGS. 2 and 4. This connection may be secured with a threaded collar 402.

In various embodiments, the stopping machine (not shown) may be connected to the gate valve (not shown) via any known method (e.g., threaded connection) prior to installing of the plug assembly 100 into the pipeline 301. In various embodiments, the stopping machine shaft 401 with the plug assembly 100, connected to it, may be oriented in such a way that the outer flat surface(s) 115 of the lower plate 103 of the plug assembly 100 mate the inner flat surface(s) 203 in the lower portion 202 of the fitting assembly 200 when the plug assembly 100 is fully inserted inside the pipe 301 (see FIGS. 4 and 7) before connection of the stopping machine to the gate valve (not shown).

After attaching the stopping machine (not shown) to the gate valve, the gate valve may be opened and the stopping machine shaft 401 with the connected plug assembly 100 may moved downwardly, thereby delivering the plug assembly 100 inside the pipeline 301 through the fitting upper portion 201. In various embodiments, the insertion continues until the lower plate 103 of the plug assembly 100 engages a "stop" 204 located in the lower portion 202 of the fitting assembly 200 as shown in FIG. 4. As may be understood by those of skill in the art, the insertion stop may be positioned in the upper or lower portions of the fitting and may engage any portion of the plug assembly 100 to provide guidance for the proper depth alignment of the plug assembly 100. Once the plug assembly 100 is properly placed in the pipeline 301, the stopping machine shaft 401 may be locked to discourage axial movement of the shaft. The shaft, however, is permitted to rotate about its longitudinal axis.

In various embodiments, clockwise rotation of the stopping machine shaft 401 will rotate the plug assembly shaft 106 clockwise. This causes the exterior threads 120 of the plug assembly shaft 106 to interact with the interior threads 107 of the lower plate 103 of the plug assembly 100. As a result of this interaction, the lower plate 103 moves towards the upper plate 102 thereby deforming the resilient plug 101 such that it expands and conforms to the contour of the surfaces of the holes 302 and 305 and the scalloped surfaces 303 and 304 created in the pipe as a result of forming the holes 302 and 305. FIGS. 8 and 9 illustrate an expanded plug assembly 100, FIGS. 4 and 5 provide a cross-section view of a pipeline 301 with a plug assembly 100 installed therein. As illustrated, the scalloped surfaces 303 and 304 formed on the interior surface of the pipeline 301 provide arcuate surfaces substantially concentric with and extending between the apertures 302 and 305. When installed, the longitudinal axis of the plug assembly 100 is also substantially concentric with the arcuate surfaces. This alignment of the plug assembly 100 and the scalloped surfaces 303, 304 provides a superior seal because less deformation is required of the resilient plug 101 to form a seal as opposed to attempting to seal an arcuate section that is not concentric with the plug. Thus, the contouring of the resilient plug 101 of the plug assembly 100 to the mating surfaces on the interior of the pipe requires less deformation than if the resilient plug surface has to contour to the pipe inside cylindrical surface having an axis that is perpendicular to the axis of the plug. In addition, contact between the resilient plug 101 and the scalloped surfaces 303, 304 can create a more reliable sealing arrangement.

As noted above, the resilient plug 101 may be deformed to form a seal along the scalloped portions 303, 304 to prevent the passage of media through the pipe 301. In the described method, media flow is stopped within a pipeline without applying vertical forces to the pipe 301 and the fitting assembly 200 thereby reducing the chances of damage to the pipe 301 and the fitting assembly 200 as seen in some prior art designs.

When desired, it is possible to completely regain original flow capacity through the pipeline 301. To restore flow within the pipeline 301, the resilient plug 101 is first brought back to its original shape by rotating plug shaft 106 counterclockwise up to the point when the shaft head 121 of the plug assembly 100 contacts the flat bottom surface 118 of the counterbore 119 of the lower plate 103. The stopping machine (not shown) may be used to apply a torque through its shaft 401 to the plug shaft 106 to attain this movement. The stopping machine shaft 401 may then be unlocked and moved upward to its rearmost position thereby moving the plug assembly 100 from inside of the pipe 301 via the aperture 302 in the pipe 301 through the upper portion 201 of the fitting assembly 200, and the gate valve (not shown) to inside the stopping machine (not shown). After this, the gate valve can be closed and the stopping machine removed.

A completion machine (not shown) can be used to install a completion plug 207 into the fitting 200 upper portion 201 to prevent the media inside the pipe 301 from escaping outside through the fitting 200 as illustrated in FIG. 10. Completion machines are well known in the piping industry. Examples of completion machines marketed by the Mueller Company™ are described at their website (i.e. www.muellercompany-.com). As one of ordinary skill in the art will understand, any type of completion machine may be used to install a completion plug.

The completion plug 207 can be secured in place by engagement between the female threads 205 of the upper portion 201 of the fitting assembly 200 and the male threads 209 of the completion plug 207. After this, the completion machine, gate valve, and the fitting flange (all not shown) can be removed from the fitting assembly 200 and a completion cap 208 can be installed. The completion cap can be secured onto the fitting assembly 200 by engagement between the male threads 206 of the upper portion 201 of the fitting assembly 200 and the female threads 210 of the completion cap 208.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for use with a pipe having an annular wall defining an outer wall surface, the outer wall surface having an aperture area and the annular wall defining an inner wall surface defining an inner pipe diameter, the system comprising:

a plug assembly including:
a shaft;

a plug;
an upper plate; and
a lower plate connected to the shaft and moveable along a linear direction towards the upper plate; and
a fitting sized to seal around the aperture area, the fitting defining a channel, the channel alignable with the aperture area and sized to accept the plug assembly.

2. The system of claim 1, wherein the shaft is connected to the lower plate via threaded engagement.

3. The system of claim 2, wherein the shaft is rotatable to move the lower plate with respect to the upper plate.

4. The system of claim 3, wherein the plug is expandable upon a rotation of the shaft to move the lower plate with respect to the upper plate.

5. The system of claim 4, wherein the rotation of the shaft moves the lower plate towards the upper plate.

6. The system of claim 1, wherein
the lower plate includes a cross-sectional profile that restricts rotation of the lower plate when the profile interacts with the fitting.

7. The system of claim 1, wherein the plug has an outside diameter larger than the inner pipe diameter.

8. A system for use with a pipe having an annular wall defining an outer wall surface having an aperture area, the system comprising:
a fitting sized to seal around the aperture area, the fitting defining a channel, the channel alignable with the aperture area;
a plug assembly including:
an upper plate;
a lower plate; and
a plug;
the lower plate including at least one portion having a cross-sectional profile that restricts rotation of the lower plate when the profile interacts with the fitting, the plug assembly sized to be accepted by the channel.

9. The system of claim 8, wherein the cross-sectional profile includes at least one flat surface.

10. The system of claim 9, wherein the cross-sectional profile includes four flat surfaces.

11. The system of claim 8, wherein the fitting defines a cavity, the profile restricting rotation of the lower plate when the profile interacts with the cavity.

12. The system of claim 11, wherein the cavity includes at least one inner flat, the profile restricting rotation of the lower plate when the profile interacts with the at least one inner flat.

13. The system of claim 12, wherein the cavity includes four inner flats.

14. The system of claim 8, wherein the lower plate moves towards the upper plate when the profile restricts the rotation of the lower plate.

15. A system for use with a pipe having an annular wall, the annular wall defining an outer wall surface having an aperture area and the annular wall defining an inner wall surface defining an inner pipe diameter, the system comprising:
a plug assembly including an expandable plug, the plug having an outside diameter larger than the inner pipe diameter; and
a fitting sized to seal around the aperture area, the fitting defining a channel, the channel alignable with the aperture area and sized to accept the plug assembly.

16. The system of claim 15, wherein the plug is cylindrical.

17. The system of claim 15, wherein the plug assembly includes an upper plate, a lower plate, and a shaft, the plug positioned between the upper plate and the lower plate.

18. The system of claim 15, wherein the plug assembly includes a mandrel disposed within the plug, the mandrel attached to the lower plate and slideably engaging the upper plate.

19. The system of claim 18, wherein the mandrel is cylindrical.

20. The system of claim 18, wherein the plug assembly includes a positioning plate disposed within the mandrel, wherein the positioning plate defines an aperture sized to accept the shaft.

21. A plug assembly for use with a pipe having an annular wall defining an inner wall surface defining an inner pipe diameter, the plug assembly comprising an expandable plug, an upper plate, a lower plate, a shaft, and a mandrel disposed within the plug, the plug positioned between the upper plate and the lower plate, the plug having an outside diameter larger than the inner pipe diameter, the mandrel attached to the lower plate and slideably engaging the upper plate, the plug assembly including a positioning plate disposed within the mandrel, the positioning plate defining an aperture sized to accept the shaft.

22. The plug assembly of claim 21, wherein the plug is cylindrical.

23. The plug assembly of claim 21, wherein the mandrel is cylindrical.

24. A method of blocking media flow through a pipe having an annular wall defining an outer wall surface having an aperture area, the method comprising the steps of:
introducing a fitting to the outer wall surface of the pipe, the fitting defining a channel;
aligning the channel with the aperture area;
forming two substantially aligned apertures in the aperture area of the pipe;
inserting a plug assembly into the pipe through one of the apertures, the plug assembly including an expandable plug, an upper plate, and a lower plate, the lower plate having a portion with a cross-sectional profile that restricts rotation of the lower plate when the profile interacts with the fitting, and a portion of the plug assembly extending through the other aperture;
restricting the rotation of the lower plate by interacting the cross-sectional profile with the fitting; and
expanding the plug.

25. The method of claim 24, wherein the cross-sectional profile includes at least one flat surface.

26. The method of claim 25, wherein the cross-sectional profile includes four flat surfaces.

27. The method of claim 24, wherein the fitting defines a cavity, and wherein restricting the rotation of the at least one of the upper plate and the lower plate by interacting the cross-sectional profile with the fitting includes interacting the cross-sectional profile with the cavity.

28. The method of claim 27, wherein the cavity includes at least one inner flat, and wherein restricting the rotation of the at least one of the upper plate and the lower plate by interacting the cross-sectional profile with the fitting includes interacting the cross-sectional profile with the at least one inner flat.

29. The method of claim 28, wherein the cavity includes four inner flats.

30. The method of claim 24, wherein restricting the rotation of the lower plate moves the lower plate towards the upper plate when the profile restricts the rotation of the lower plate.

31. A method of blocking media flow through a pipe having an annular wall defining an outer wall surface having an aperture area, the method comprising the steps of:

introducing a fitting to the outer wall surface of the pipe, the fitting defining a channel;

aligning the channel with the aperture area;

forming two substantially aligned apertures in the aperture area of the pipe;

inserting a plug assembly into the pipe through one of the apertures, the plug assembly including an expandable plug, an upper plate, a lower plate, and a shaft, the shaft moveably connected to the lower plate, extending a portion of the plug assembly through the other aperture; and expanding the plug by moving the shaft to cause the lower plate to move with respect to the upper plate.

32. The method of claim 31, wherein the step of expanding the plug by moving the shaft to cause the lower plate to move with respect to the upper plate is accomplished by moving the lower plate towards the upper plate.

33. The method of claim 31, wherein the shaft is connected to the lower plate via threaded engagement.

34. The method of claim 33, wherein the step of expanding the plug by moving the shaft to cause the lower plate to move with respect to the upper plate is accomplished by rotating the shaft.

35. The method of claim 31, the lower plate including a cross-sectional profile that restricts rotation of the lower plate when the profile interacts with the fitting, and the method further comprising the step of restricting the rotation of the at least one of the upper plate and the lower plate by interacting the cross-sectional profile with the fitting.

36. The system of claim 31, wherein the plug has an outside diameter larger than the inner pipe diameter.

\* \* \* \* \*